(12) United States Patent
Leonard et al.

(10) Patent No.: US 9,943,186 B2
(45) Date of Patent: Apr. 17, 2018

(54) RUGGED, ONE-PIECE, PORTABLE, COLLAPSIBLE, INSULATING CHAFING DISH FRAME WITH INTEGRAL WIND SCREEN APPLICABLE FOR ELEGANT FORMAL EVENTS

(71) Applicant: Get-A-Grip Chafing Pans, LLC., Gibsonia, PA (US)

(72) Inventors: Lois Leonard, Gibsonia, PA (US); Joseph L Leonard, Gibsonia, PA (US)

(73) Assignee: GET-A-GRIP CHAFING PANS, LLC, Pittsburgh, PA (US)

( * ) Notice: Subject to any disclaimer, the term of this patent is extended or adjusted under 35 U.S.C. 154(b) by 916 days.

(21) Appl. No.: 14/320,945

(22) Filed: Jul. 1, 2014

(65) Prior Publication Data
US 2015/0040777 A1   Feb. 12, 2015

Related U.S. Application Data

(60) Provisional application No. 61/863,542, filed on Aug. 8, 2013.

(51) Int. Cl.
| | |
|---|---|
| A47J 37/07 | (2006.01) |
| A47J 37/06 | (2006.01) |
| F24C 15/08 | (2006.01) |
| A47J 29/02 | (2006.01) |
| A47J 36/24 | (2006.01) |
| A47J 36/26 | (2006.01) |

(52) U.S. Cl.
CPC ........... *A47J 29/02* (2013.01); *A47J 36/2405* (2013.01); *A47J 36/26* (2013.01)

(58) Field of Classification Search
None
See application file for complete search history.

(56) References Cited

U.S. PATENT DOCUMENTS

| | | | |
|---|---|---|---|
| 1,261,566 A | 4/1918 | Lewitz | |
| 1,714,379 A | 5/1929 | Kratz | |
| 3,828,966 A | 8/1974 | Martin | |
| 3,841,298 A * | 10/1974 | Sellors | A47J 37/0768 126/9 A |
| 3,858,495 A * | 1/1975 | Gotwalt | A47J 37/0694 99/421 A |
| 4,106,486 A | 8/1978 | Lee | |
| 4,214,392 A * | 7/1980 | Virsen | G09F 15/0068 160/135 |

(Continued)

*Primary Examiner* — David Angwin
*Assistant Examiner* — Gyounghyun Bae
(74) *Attorney, Agent, or Firm* — Blynn L. Shideler; Krisanne Shideler; BLK Law Group

(57) ABSTRACT

A rugged, one-piece, portable, collapsible, insulating chafing dish frame includes an integral wind screen and is configured for application in elegant formal events. The one-piece, portable and collapsible construction allows caterers and tailgaters to easily transport the frame to the desired location. The integrated wind screen allows the unit to be efficiently used in outdoor locations, such as by tailgaters and caterers. The insulating features can improve food service and decrease fuel consumption for the users. The hiding of conventional chafing dish frame components allows the unit to be associated with elegant formal events, increasing the usefulness to caterers.

12 Claims, 5 Drawing Sheets

(56) References Cited

U.S. PATENT DOCUMENTS

| | | | | |
|---|---|---|---|---|
| 4,648,658 A * | 3/1987 | Calco | | A47C 5/005 206/216 |
| 4,714,013 A * | 12/1987 | Telfer | | F24C 1/16 126/9 R |
| 4,793,320 A * | 12/1988 | Bakic | | A47J 37/0768 126/25 B |
| 4,920,873 A * | 5/1990 | Stevens | | A47J 27/14 126/246 |
| 4,958,618 A * | 9/1990 | Davidson | | A47J 36/022 126/25 R |
| 4,996,970 A * | 3/1991 | Legare | | A45F 3/04 126/204 |
| 5,038,749 A * | 8/1991 | Jerry | | F24C 3/14 126/38 |
| 5,105,726 A * | 4/1992 | Lisker | | A47J 37/0763 99/340 |
| 5,117,808 A * | 6/1992 | Peters | | F24C 3/14 126/25 R |
| 5,517,903 A | 5/1996 | Kaufman | | |
| 5,711,210 A * | 1/1998 | Kaufman | | A47J 27/10 126/9 R |
| 5,809,989 A * | 9/1998 | Nelson | | A62C 3/00 126/25 R |
| 5,992,406 A | 11/1999 | Lelle | | |
| 6,035,768 A * | 3/2000 | Kaufman | | A47J 33/00 126/275 R |
| 7,175,033 B1 | 2/2007 | Riopel | | |
| 7,934,494 B1 * | 5/2011 | Schneider | | A47J 33/00 126/241 |
| 2004/0011350 A1 * | 1/2004 | Dowst | | A47J 27/022 126/344 |
| 2005/0115556 A1 * | 6/2005 | Carson | | A47J 37/0786 126/25 R |
| 2008/0236573 A1 * | 10/2008 | Fehr | | F24B 1/024 126/9 A |
| 2013/0022727 A1 * | 1/2013 | Sherwin | | F24J 2/02 426/523 |
| 2013/0032130 A1 * | 2/2013 | Jacques | | A47J 33/00 126/30 |

\* cited by examiner

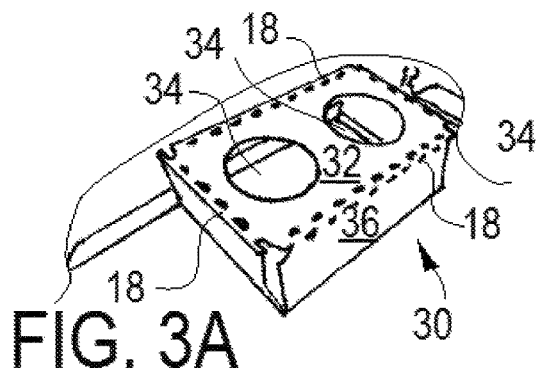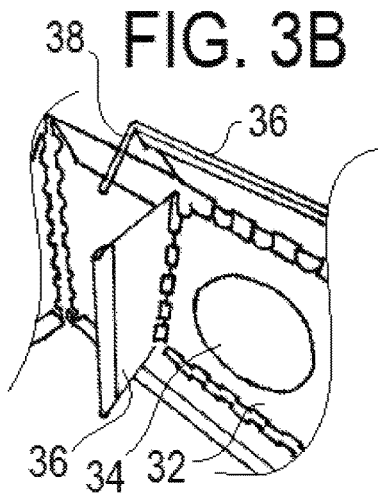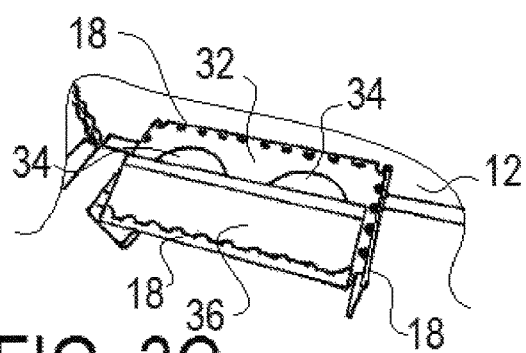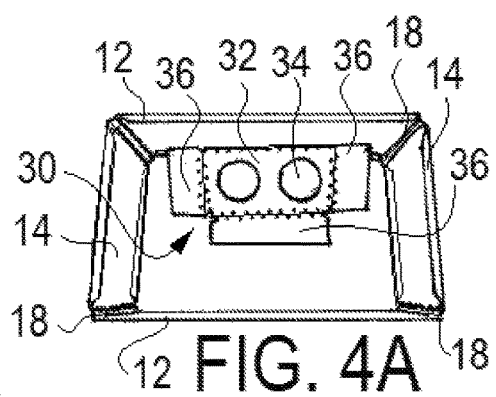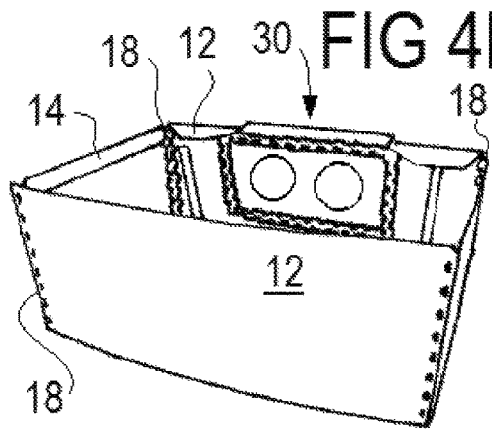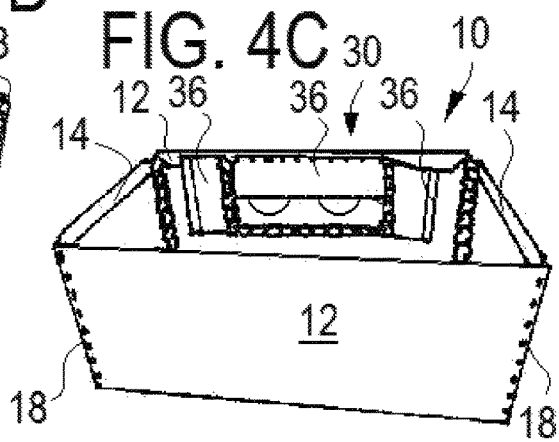

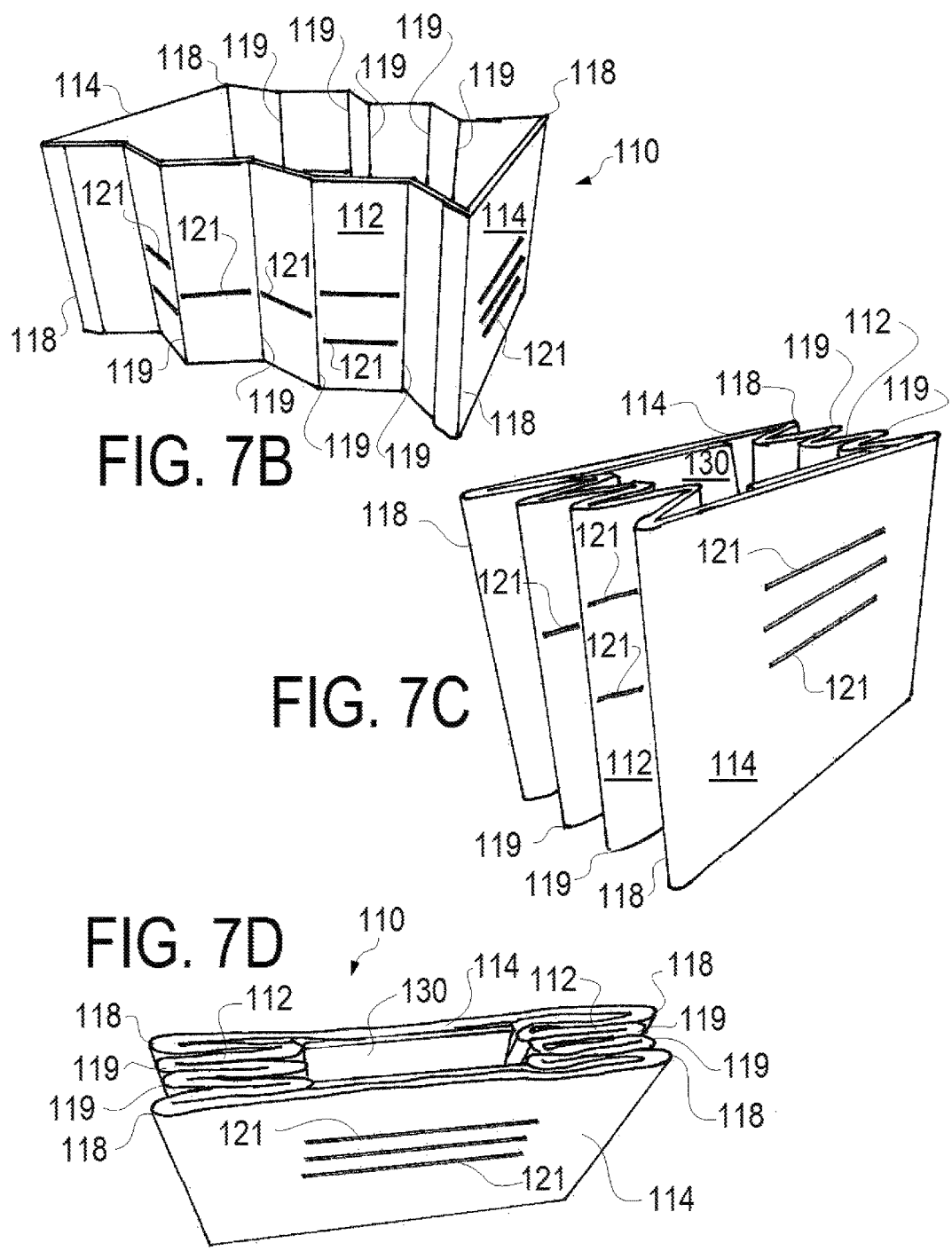

RUGGED, ONE-PIECE, PORTABLE, COLLAPSIBLE, INSULATING CHAFING DISH FRAME WITH INTEGRAL WIND SCREEN APPLICABLE FOR ELEGANT FORMAL EVENTS

CROSS-REFERENCE TO RELATED APPLICATION

This application claims the benefit of U.S. Provisional Patent Application Ser. No. 61/863,542, entitled "Rugged, One-Piece, Portable, Collapsible, Insulating Chafing Dish Frame with Integral Wind Screen Applicable for Elegant Formal Events" which is incorporated by reference herein.

BACKGROUND OF THE INVENTION

1. Field of the Invention

The invention relates to the field of catering apparatus, and in particular, to a rugged, one-piece, portable, collapsible, insulating chafing dish frame with integral wind screen applicable for elegant formal events and to the associated chafing dish assembly incorporating the same.

2. Description of Related Art

Food catering services often serve the prepared foods from a buffet line from one or more chafing dish units or assemblies which are typically comprised of a frame for holding a water pan, aka double-boiler pan, and for positioning a heat source under the water pan. The water pan is partially filled with water and a serving chafing dish is nested within it. The serving dish itself may also be provided with a cover. In this manner, heat from the heat source, typically a candle or a fuel can, such as manufactured under the STERNO® mark, is used to transfer heat to the water in the water pan from whence it is transferred through vapor convection to the serving pan and the food therein.

The chafing dishes in catering service generally have a limited life due to repeated or rough handling. This is particularly the case in the application of mobile catering where the chafing dishes must be transferred from a storage space in the catering kitchen, to the catering truck, transported to the catering site and then set up on the buffet table at the catering site. After the catering service is rendered, the process is reversed. Repeated rough handling in this type of environment eventually results in damage to the chafing dish.

In the case where the chafing dish has been made portable by having collapsible design so that storage of multiple chafing dishes within the limited space of the catering truck is facilitated, the design which permits portability generally compromises its structural rigidity and robustness. Therefore, many portable and collapsible chafing dish designs have even a more limited life time in catering applications than the more bulky and non-collapsible rigid chafing dishes. For this reason, as a practical matter collapsible chafing dish units have not been widely adopted in the industry.

Several types of collapsible chafing dishes or cooking implements have been proposed in the Patent literature. U.S. Pat. No. 1,261,566 shows a baking pan having a bottom with an up-standing side and end flanges, side walls and end walls. Each wall has a lower end which is hinged to the respective side. In addition, and hinged flange and latch are pivotally connected to a flange, seen in FIG. 1 of the '566 patent, of each end wall. Latch is received by a loop in each side wall.

U.S. Pat. No. 1,714,379, which is incorporated herein by reference, shows a baking pan having a bottom each side of which is provided with a cylindrical roll, side walls and end walls. Each side has a lower end provided with a U-shaped extension which is adapted to be received within roll so that each side wall and end wall is hinged to bottom. The ends of side walls and rolled about a reinforcing wire, seen in FIG. 2 of the '379 patent, while ends of end walls are shaped to provide a cylindrical rolled extension which receive the rolled ends of side walls.

U.S. Pat. No. 3,828,966, which is incorporated herein by reference, shows a baking pan which is comprised of base and four sides, each of which are hinged by hinges to a base. The hinges include fold out support as shown in side view in FIG. 4 of the '966 patent and in prospective view in FIG. 3 of the '966 patent. Each support includes a laterally extending member having a hinged upstanding member which holds sides in place when the sides are in a closed position.

U.S. Pat. No. 3,841,298, which is incorporated herein by reference, discloses a portable "grill stand" (or chafing dish frame) formed from a single piece of folded and partially glued material which has four side panels, each of which intersects in a leg portion, and all inter-fitting to form a generally isosceles trapezoidal cross-section. The upper edge portion of the stand is proportioned to receive and support a pan with an overlying grid portion having self-contained ignitable cooking material such as charcoal held in place by wax. Portholes are provided in the side panels to provide for cooling, and a large aperture is provided in the base of the stand for cooling purposes. In addition, the longitudinal edges of the side panels are scalloped to provide for point contact and maximum cooling along the support. The lower portion of the side panels are reversely folded to define a double thickness, and the end portions are duplicated to define a double thickness at the four corner legs. Double thickness is further defined at the upper edge of the end panels where they are reversely folded inwardly and interlocked by means of a flap engaging a crescent-shaped slot.

U.S. Pat. No. 4,106,486, which is incorporated herein by reference, shows a cooking utensil comprising a bottom pan, and inner pan which fits into bottom pan. A space is provided between the walls of inner pan and the opposing walls of bottom pan. A cover for bottom pan and inner pan is also provided. Inner pan includes a perforated bottom, perforated opposing side walls and perforated opposing end walls. Handles are attached to side walls. End walls are hinged at the lower corners to the side walls by pivot pins. The open configuration of pan is illustrated in FIG. 4 of the '486 patent. The '486 patent shows a nested set of pans with covers that included at least one foldable side on one of the pans.

U.S. Pat. No. 5,517,903, which is incorporated herein by reference, discloses a chafing dish assembly comprising a lid, a food pan coverable by the lid, a water pan into which the food pan nests, and a collapsible stand into which the water pan nests. The collapsible stand is comprised of four sides forming a rectangular structure. Each adjacent side is coupled together by element of a flatly folding hinge. A structural element is provided for temporarily rendering the collapsible stand rigid. In the preferred embodiment, this element is a tray for holding and positioning the burners. As a result, a rugged, easily stored, collapsible chafing dish assembly is provided. The hinge between each of the sides of the stand is integrally formed with each side. The stand has two opposing lateral sides and two opposing end sides.

The lateral sides are provided with a plurality of apertures defined there through to promote air draft.

U.S. Pat. No. 5,992,406, which is incorporated herein by reference, discloses a collapsible and nest-able steam table comprises a foldable frame, at least one tray and a foldable top section capable of receiving and storing both the frame and the at least one tray. The frame has a front plate, a rear plate and a pair of folding end plates pivotally mounted thereto to collapse the frame. The at least one tray is removably disposed within the frame to prevent the end plates from folding toward each other while the steam table is in use. The top member comprises C-shaped first and second shells each having an extension member and a first arm, a second arm and a third arm extending outwardly there from. The first, second and third arms of the first shell are respectively pivotally mounted to the first, second and third arms of the second shell. Each arm has protrusions and tabs extending outwardly there from, and the protrusions and tabs of a given arm are spaced-apart a sufficient distance to removably receive the frame and the at least one tray. The frame and the at least one tray are placeable between the protrusions and tabs and secured within the top member by pivoting the first and second shells into contact with each other.

U.S. Pat. No. 7,175,033, which is incorporated herein by reference, discloses a portable chafing stand system for providing a chafing stand that is portable and that reduces fuel consumption. The portable chafing stand system includes a pair of end members and a pair of side members attachable to one another. The end members each have a plurality of first slots and a plurality of second slots. The side members each have a plurality of catch members that are received within the first slots and the second slots. The side members preferably have a lower lip for supporting the fuel unit. The end members each include a pair of upper supports for supporting an upper lip of a disposable food tray. The upper edge of the side members supports the floor of the disposable food tray.

What is needed, therefore, is a rugged chafing dish frame which can be compactly stored and transported, but which is of such a design that it is neither bulky nor prone to damage by ordinary rough handling. Additionally needed is a portable collapsible chafing dish frame which folds flatly or compactly to facilitate storage in limited space. Further a rugged portable collapsible chafing dish frame including insulating aspects and with an integrated wind screen and a design which is applicable for elegant formal events is needed for wide adoption of such units by caterers in the field.

SUMMARY OF THE INVENTION

The inventors of the present invention provides a rugged one-piece, portable, collapsible, insulating chafing dish frame includes an integral wind screen and is configured for application in elegant formal events. The one-piece, portable and collapsible construction allows caterers and tailgaters to easily transport the frame to the desired location. The integrated wind screen allows the unit to be efficiently used in outdoor locations, such as by tailgaters and caterers. The insulating features can improve food service and decrease fuel consumption for the users. The hiding of conventional chafing dish frame components allows the unit to be associated with elegant formal events, increasing the usefulness to caterers.

One aspect of the invention provides a one-piece, portable, collapsible, insulating chafing dish frame includes an integral wind screen comprising a pair of opposed sides; a pair of opposed ends; and hinges coupling the ends and the sides, wherein upper edges of the sides and ends are configured to support a water pan or associated chafing pan. A rugged, one-piece, portable, collapsible, insulating chafing dish frame according to may be provided by further including a pair of opposed metal sides, a pair of opposed metal ends and hinges coupling the ends and the sides, wherein upper edges of the sides and ends are configured to support a water pan or associated chafing pan.

One aspect of the invention provides a one-piece, portable, collapsible, insulating chafing dish frame includes an integral wind screen comprising a pair of opposed corrugated cardboard sides having a plurality of living hinges along the sides; a pair of opposed corrugated cardboard ends; and living hinges coupling the ends and the sides, wherein upper edges of the sides and ends are configured to support a water pan or associated chafing pan.

These and other advantages of the present invention will be clarified in the detailed description of the preferred embodiments taken together with the attached figures wherein like reference numerals reference like elements throughout.

BRIEF DESCRIPTION OF THE DRAWINGS

FIGS. 3A-C are a top perspective views of the disassembly of the burner support of the frame of FIG. 1;

FIGS. 4A-C are a top perspective views of the collapsing of the burner support of the frame of FIG. 1;

FIG. 7B is a side perspective view of the collapsing of the frame of FIG. 6;

FIG. 7C is a side perspective view of the collapsing of the frame of FIG. 6 further collapsed than FIGS. 7A and 7B; and FIG. 7D is a side perspective view of a collapsed frame of FIG. 6.

DETAILED DESCRIPTION OF THE INVENTION

Figure 1:
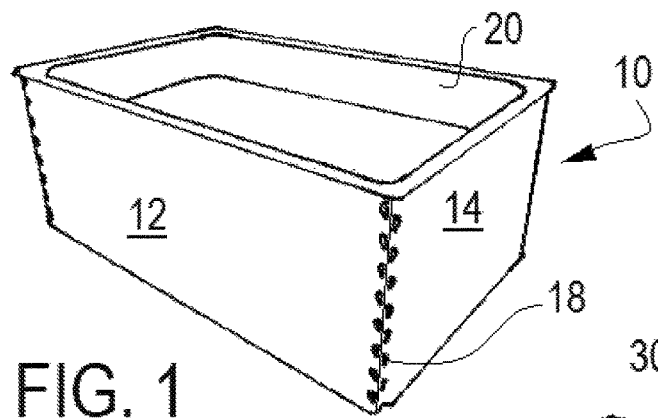
FIG. 1 is a top perspective view of a rugged one-piece, portable, collapsible, insulating chafing dish frame which includes an integral wind screen and is configured for application in elegant formal events together with a water pan in accordance with one aspect of the present invention.
Figure 2A:
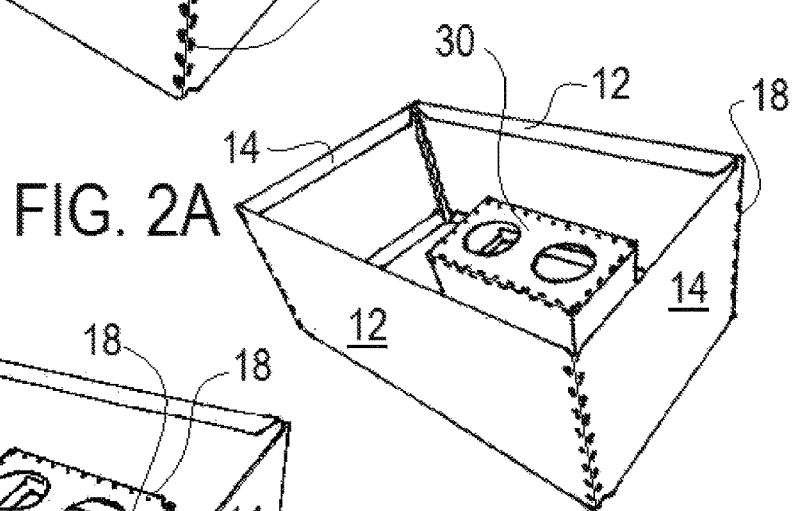
FIGS. 2A and B are a top perspective views of the frame of FIG. 1.
Figure 2B:
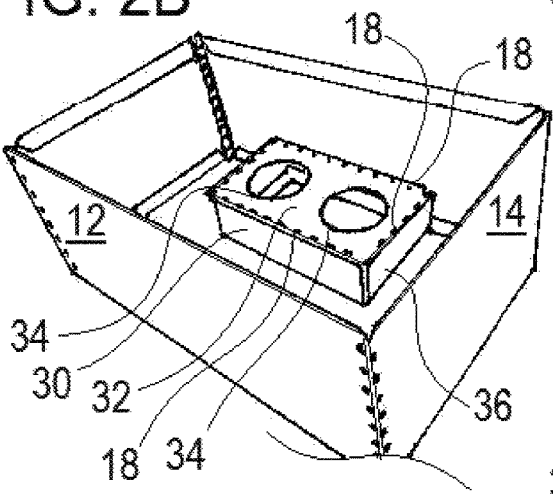
FIG. 2C is an enlarged bottom perspective view of a burner support of the frame of FIG. 1.
Figure 2C:
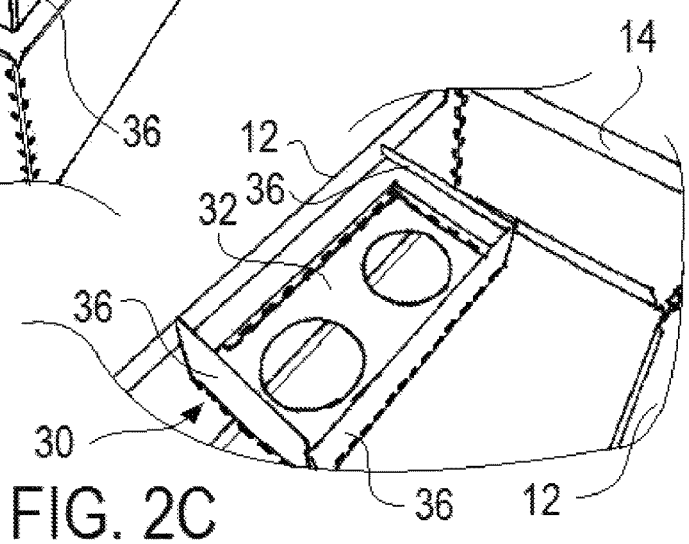

It is noted that, as used in this specification and the appended claims, the singular forms "a," "an," and "the" include plural referents unless expressly and unequivocally limited to one referent. The various embodiments and examples of the present invention as presented herein are each understood to be non-limiting with respect to the scope of the invention. Chafing dish is a term used with a level of imprecision in the art to define the overall assembly or unit as well as the individual water pans and serving pans and the collection of the water pans and serving pans. In this application the overall system will be referenced as a chafing dish assembly or unit.

The chafing dish in this application will reference the collection of the water pan and serving pan together (with associated cover, if any) or the serving pan individually and may also be referenced as a chafing pan. The water pan may also be referenced in this application, and as generally known in the art, as a water dish or a double boiler pan (or dish). The food containing serving pan may also be referenced in this application, and as generally known in the art, as a serving dish, or chafing pan or chafing dish, or food pan (or dish) or steamer (where there are holes allowing steam from the water pan to come through), steaming pan, or steaming dish. The wide variance in select element terminology does not affect the basic understanding of the invention or the precise scope of the claims.

FIGS. 1-5

FIGS. 1-5 show a schematic a rugged one-piece, portable, collapsible, insulating chafing dish frame 10 which includes an integral wind screen and is configured for application in elegant formal events in accordance with one aspect of the present invention. The frame 10 includes a pair of opposed metal sides 12 and pair of opposed metal ends 14 coupled by hinges 18. Water pan 20 and associated chafing pan or dish (not shown) is supported on the frame 10. Frame 10 includes an integral burner support 30 comprising a metal top 32 with burner openings 34 for supporting burners there in, with three legs 36 on three sides thereof.

The one-piece, portable and collapsible construction of frame 10 allows caterers and tailgaters to easily transport the frame 10 to the desired location. The integrated wind screen allows the unit to be efficiently used in outdoor locations, such as by tailgaters and caterers. The insulating features can improve food service and decrease fuel consumption for the users. The hiding of conventional chafing dish frame components allows the unit to be associated with elegant formal events, increasing the usefulness to caterers.

Metal Sides and Ends

The metal sides 12 and ends 14 are formed as a substantially solid sheet and can easily be formed as an aluminum sheet, preferably an anodized aluminum sheet. The only openings in the sides or ends 12 and 14 are in the area of the integral hinges 18 and the adjacent sides, thus the structure is not "air tight" as such would prevent the burners from operating, but does form a very effective wind screen for outdoor use.

The upper and lower edges of each of the sides and ends 12 and 14 may incorporate a rolled reinforced edge as shown to increase the edge supporting the water pan 20 and serving pan as well as to improve the appearance of the frame 10.

As noted the preferred material is anodized aluminum and anodizing is a process that increases the thickness of the natural oxide layer on a metal's surface. Anodizing aluminum increases its corrosion resistance and the oxide layer created by anodizing can also be given a desired color. This method of coloring aluminum is generally more durable than simply painting it since the metal itself is colored.

The preferred material for sides and ends 12 and 14 is aluminum but other materials may be considered, such as galvanized steel or even hard plastic if the heat resistant properties are present for the burner 30 construction. Aluminum has a low density, which results in a higher heat exchange when compared to galvanized steel. Aluminum is preferred over galvanized steel due to its increased performance and light weight and cost advantages. Aluminum products are also preferred over galvanized steel due to their anti bacterial properties and easy to clean nature, especially when there is foodstuff involved. As compared to hard and smooth aluminum surfaces, galvanized steel surfaces, if untreated, are generally porous and rough, which can hold and accumulate bacterial growth and contaminate food processing.

Hinges

Hinges 18 are generally conventional piano style hinges formed by overlapping meshed engaging leaves or loops from adjacent members, such as sides 12 and ends 14, with the leaves extending around a center metal hinge pin, generally steel, forming the piano hinge as shown. This is also known as a continuous hinge. The formation of hinges 18 along the coupling of sides 12 to ends 14 create airflow openings sufficient for unimpeded operation of the burners (not shown) and without detrimentally effecting the wind screen functions of the frame 10. As shown the hinges 18 are used for coupling all of the adjacent panel type elements of the frame 10, with each hinge formed in the similar manner.

Chafing Pan

Water pan 20 is supported on the frame 10. An associated food containing serving pan (not shown) is supported on the water pan 20 in a conventional fashion. In some applications only a food pan is used and an intervening water pan is omitted. Further the continuous support from the panel type sides 12 and ends 14 allow disposable food trays to be utilized, which can greatly improve cleanup, which is extremely helpful to caterers and tailgaters alike. Other details of the chafing pan structures are not needed as these are conventional elements known in the art.

Integral Burner Support

Frame 10 includes an integral burner support 30 comprising a metal top 30 with burner openings 34 for supporting burners (not shown) there in. The top 32 can be formed of material similar to the sides 12 and ends 14. The top 32 is hinged via a hinge 18 to one of the sides 12. The structure of continuous piano hinge 18 is discussed above. The openings 34 receive conventional burners therein such as sold under the STERNO® brand. The burners could be supported on the top 32 within openings 34 through a flange member on the burner or the burner may simply sit on the "ground" beneath the entire frame. The burner may be a candle or similar element, as well.

The burner support 30 includes with three legs 36 on three sides of the top 32 and secured thereto through a respective continuous or piano hinge 18, formed as discussed above. The fourth side of the top 32 is coupled to and supported by the associated side 12. The legs 36 of the burner support 30 may include interlocking mechanism, such as pins 38 on opposed ends of the central leg 36. Each pin 38 can be configured to engage an associated receiving slot in an adjacent leg 36 to secure the legs 36 together. Other locking mechanisms maybe utilize other than pins 38, or the pins 38 may be provided on the alternative legs 36.

Rugged, One-Piece, Portable, Collapsible Construction

The use of solid metal panel type elements for forming the sides 12, end 14, top 32 and legs 36 together with interconnected continuous hinges allow for a rugged and one piece construction for the frame 10. The rugged and one-piece design will both contribute to a longer effective life of the frame in use, particularly in catering applications.

Figure 5A:
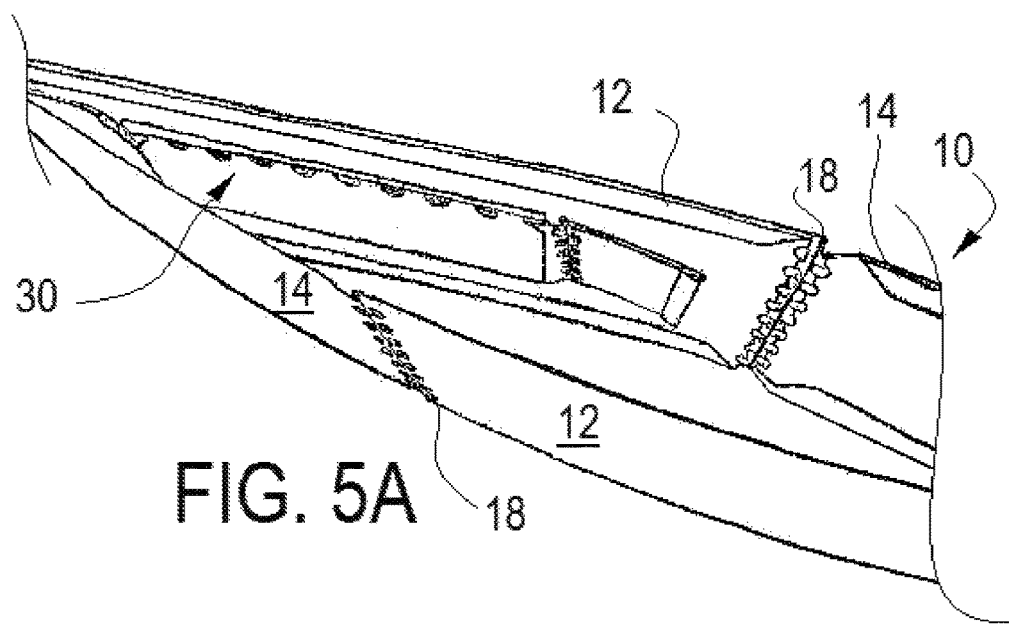
FIGS. 5A-B are a top perspective views of the collapsing of the frame of FIG. 1.
Figure 5B:
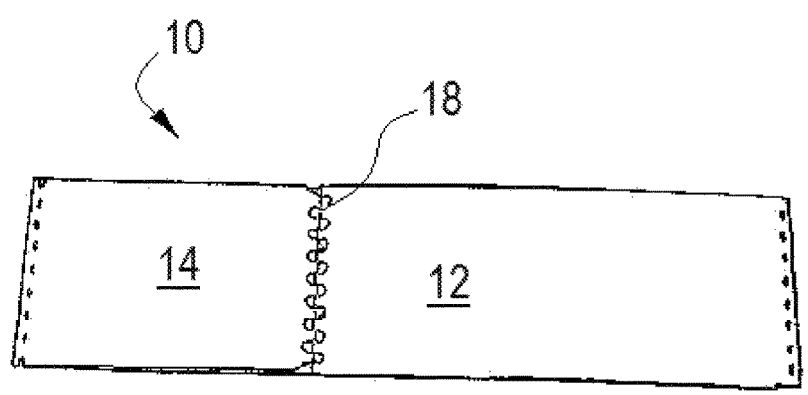

The use of aluminum for the formation of panel members allows for a relatively lightweight construction assisting in the portability of the frame 10. The collapsible construction also greatly increases the portability of the frame 10. The collapsing of the assembled frame 10 first begins with removal of the water pan 20 and food serving pan and of the burners (hopefully after they have been extinguished). The burner support 30 will be disassembled as shown in FIGS. 3A-C, generally by pulling pins 38 from the engaged slots and folding the support 30 flat against the associated side 12 through operation of hinges 18 and shown in FIGS. 4A-C. The sides 12 and ends are folded flat as shown in FIGS. 5A-B. The Assembly is simply the reverse process.

Integral Wind Screen

One of the key aspects of the present invention is the provision of solid sides 12 and ends 14, wherein the only openings in the sides or ends 12 and 14 are in the area of the integral hinges 18. This configuration forms a very effective wind screen for outdoor use of the frame 10, with the wind screen integrated into the frame construction. Wind screens of the prior art are often separate structures placed around the outside of the frame. The key for the wind screen aspects in maintain the sides 12 and ends 14 as substantially solid between the hinges 18. The hinge construction 18 is sufficient to prevent an air tight structure that would hinder burner operation.

The integrated wind screen makes the frame 10 well suited for tailgating consumers and for caterers to utilize in outdoor environments. Additionally the metal sides 12 and ends 14 of frame 10 provide an integrated wind screen that avoids the fire hazards of many conventional chafing assembly wind screens currently in use in the prior art.

Insulating Chafing Dish Frame

The solid panels forming sides and end 12 and 14 create an insulating air gap within the frame 10 when in use, which will trap the heat therein. This heat trapping function will greatly decrease the amount of heat needed to obtain the same food heating results. In practical terms, for many food stuffs supplied in chafing dish assembly using frame 10, only a single burner will be used, where two burners would have been used in the past with prior art frames. For caterers this can be an important savings, quickly paying for the cost of the frame of the present invention in only a few outings due to a decrease in the fuel used.

Application in Elegant Formal Events or Particular Venues

White, or black, anodized aluminum sides 12 and ends 14 creates a formal appearance that avoids the conventional chafing dish frame look of the prior art and allows for application of the frame 10 in elegant formal events, which will increase the usefulness of the frame to caterers and other professionals in the field.

Additionally the sides and ends 12 and 14 may be embossed on the surface to increase the visual appeal or may have other visible indicia thereon, such as logos or designs. For example a hotel may include the hotel logo on the sides to present a uniform appearance. For tailgating application additional ornamentation on solid sides and ends 12 and 14 may include a team, e.g., a STEELER® logo PACKERS® for football, as these particular sports team fans are well known for their tailgating endeavors on gameday.

FIGS. 6-7

Figure 6:
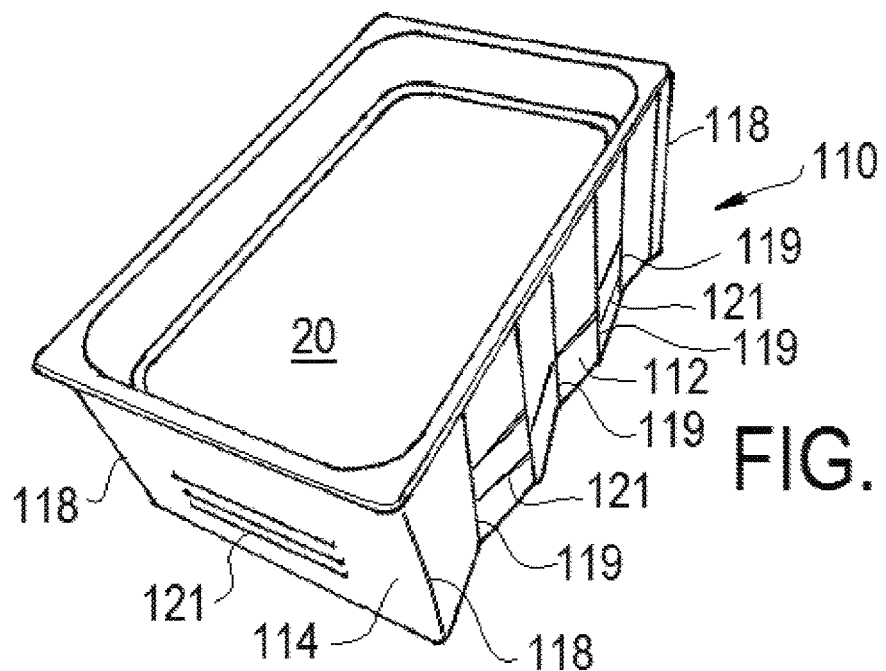
FIG. 6 is a top perspective view of a rugged one-piece, portable, collapsible, insulating chafing dish frame which includes an integral wind screen and is configured for application in elegant formal events together with a water pan in accordance with another aspect of the present invention.
Figure 7A:
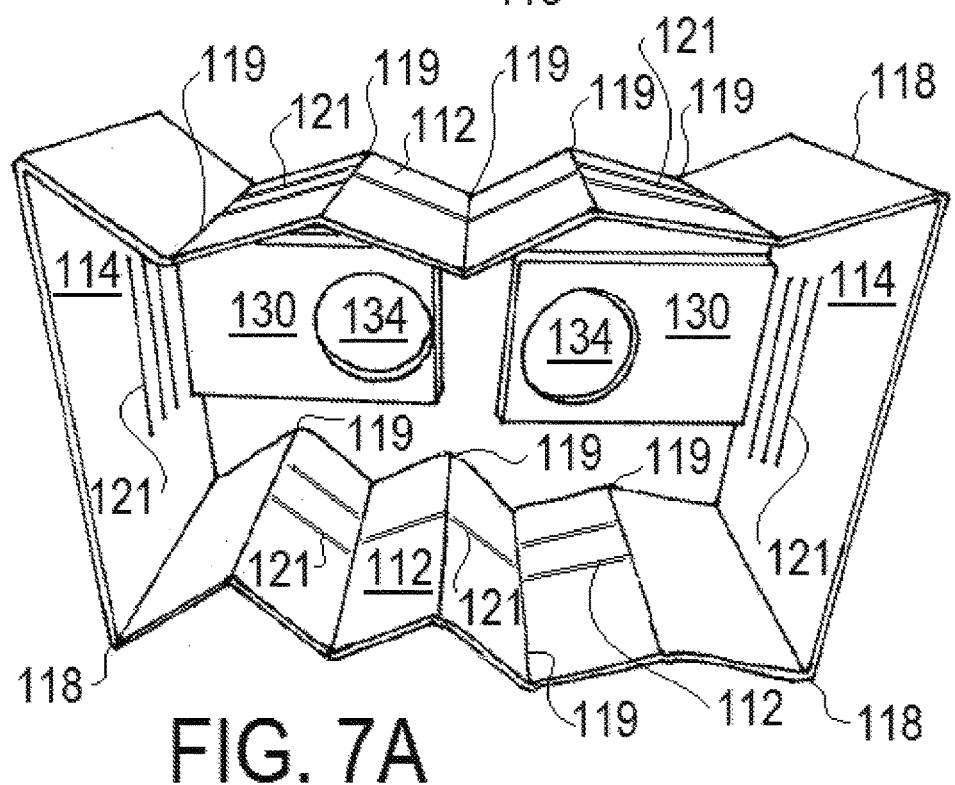
FIG. 7A is a top perspective view of the collapsing of the frame of FIG. 6.

FIGS. 6-7 show a schematic a one-piece, portable, collapsible, insulating chafing dish frame 110 which includes an integral wind screen and is configured for application in formal events in accordance with another aspect of the present invention. The frame 110 includes a pair of opposed sides 112 and pair of opposed ends 114 coupled by living hinges 118. Water pan 20 and associated chafing pan or dish (not shown) is supported on the frame 110. Frame 110 includes an integral burner support 30 with burner openings 34 for supporting burners there in. The main distinction between frame 10 and frame 110 is the configuration of frame 110 is designed to better accommodate forming the frame 110 out of disposable materials, such as corrugated cardboard. This will allow the caterer to combine the frame 110 with disposable pans 20 (thin aluminum pans) to allow the caterer to set up and leave, or the customer can take them themselves and set them up.

The one-piece, portable and collapsible construction of frame 110 allows caterers and tailgaters to easily transport the frame 110 to the desired location. The integrated wind screen allows the unit to be efficiently used in outdoor locations, such as by tailgaters and caterers. The insulating features can improve food service and decrease fuel consumption for the users. The hiding of conventional chafing dish frame components allows the unit to be associated with elegant formal events, increasing the usefulness to caterers.

Cardboard/Plastic Sides and Ends

The sides 112 and ends 114 are formed as a substantially solid sheet and can easily be formed as a corrugated cardboard, or possibly plastic, which can receive living hinges 118 and 119 therein. Living hinges 118 and 119 are fold lines in the material with hinges 118 being between the sides 112 and ends 114, while hinges 119 are along the sides 112. Additional vents 121, or openings, are provided the sides 112 and ends 114 so that the structure is not "air tight" as such would prevent the burners from operating. The vents 121 are small as shown such that the frame 110 does form a very effective wind screen for outdoor use.

As noted the preferred material is corrugated cardboard or possibly plastic to allow for an inexpensive frame 110 to give the caterer options and to provide a cost effective solution. This does not mean that the frame 110 is not reusable. In fact it would be likely that a tailgate enthusiast would utilize the same frame 110 for a whole season before discarding.

The preferred material for the frame 110 is corrugated cardboard, however a heat resistant treatment may be beneficially applied, typically by spraying (but other known methods including dipping, rolling, brushing, may also be used) to provide desired heat resistant properties for the burner 130 construction and the associated frame 110. Conventional heat treatment agents are known in the art.

Hinges

Hinges 118 and 119 are generally conventional living hinges formed in the material forming a natural fold line. This is also known as a continuous hinge. The formation of hinges 118 along the coupling of sides 112 to ends 114, unlike hinges 18 above, fail to create airflow openings, so vents 121 are supplied to create airflow sufficient for unimpeded operation of the burners (not shown) and without detrimentally effecting the wind screen functions of the frame 110. As shown the hinges 118 are used for coupling adjacent panel sides 112 and ends 114 of the frame 10, and hinges 119 are along sides 112, with each hinge 118 and 119 formed in the similar manner.

Chafing Pan

Water pan 20 is supported on the frame 110. An associated food containing serving pan (not shown) is supported on the water pan 20 in a conventional fashion. In some applications only a food pan is used and an intervening water pan is omitted. Further the continuous support from the panel type sides 112 and ends 114 allow disposable food trays to be utilized, which can greatly improve cleanup, which is extremely helpful to caterers and tailgaters alike. Other details of the chafing pan structures are not needed as these are conventional elements known in the art.

Integral Burner Support

Frame 110 includes an integral burner support 130 with burner openings 134 for supporting burners (not shown) there in. The support 130 can be formed of material similar to the sides 112 and ends 114 with heat resistant treatment applied thereto. The burner support 130 is hinged via a hinge coupling to one of the ends 114. The hinge connection may be a living hinge formed in a part of the support 130 with a portion of the support 130 on the other side of the hinge being adhesively attached to the end 114. The structure of continuous living hinge such as 118 and 119 is discussed above. The openings 134 receive conventional burners therein such as sold under the STERNO® brand. The burners could be supported on the support 130 within openings 134 through a flange member on the burner or the burner may simply sit on the "ground" beneath the entire frame 110. The burner may be a candle or similar element, as well.

One-Piece, Portable, Collapsible Construction

The use of corrugated cardboard, or plastic, for the formation of panel members allows for a relatively lightweight construction assisting in the portability of the frame 110. The collapsible construction also greatly increases the portability of the frame 110 as well as marketing (and shelve space) advantages in stores. The collapsing of the assembled frame 110 first begins with removal of the water pan 20 and food serving pan and of the burners (hopefully after they have been extinguished). The burner support 130 will be folded flat against the associated ends. The hinges 119 in sides 112 allow the sides to collapse in what is known as an accordion fashion and ends 114 are moved toward each other as shown in FIG. 7B-C such that the collapsed frame 110 is folded flat as shown in FIG. 7D. The assembly of the frame 110 is simply the reverse process.

Integral Wind Screen

One of the key aspects of the present invention is the provision of substantially solid sides 112 and ends 114, wherein the only openings in the sides 112 or ends 114 are in the area of the small vents 121. This configuration forms a very effective wind screen for outdoor use of the frame 110, with the wind screen integrated into the frame construction. Wind screens of the prior art are often separate structures placed around the outside of the frame. The key for the wind screen aspects in maintain the sides 112 and ends 114 as substantially solid with the vents being sized to allow the continued operation of the burners. The vents 121 are sufficient to prevent an air tight structure that would hinder burner operation.

The integrated wind screen makes the frame 110 well suited for tailgating consumers and for caterers to utilize in outdoor environments. Additionally the flame resistant treated sides 112 and ends 114 of frame 110 provide an integrated wind screen that avoids the fire hazards of many conventional chafing assembly wind screens currently in use in the prior art.

Insulating Chafing Dish Frame

The substantially solid panels forming sides and end 112 and 114 create an insulating air gap within the frame 110 when in use, which will trap the heat therein. This heat trapping function will greatly decrease the amount of heat needed to obtain the same food heating results. In practical terms, for many food stuffs supplied in chafing dish assembly using frame 110, only a single burner will be used, where two burners would have been used in the past with prior art frames. For caterers this can be an important savings, quickly paying for the cost of the frame of the present invention in only a few outings due to a decrease in the fuel used.

Application in Events or Particular Venues

Solid sides 112 and ends 114 creates an appearance that avoids the conventional chafing dish frame look of the prior art and allows for any desired look to the frame 110, which will increase the usefulness of the frame 110 to caterers and other professionals in the field. The sides and ends 112 and 114 may easily have visible indicia thereon, such as logos or designs. For example a hotel may include the hotel logo on the sides to present a uniform appearance. For tailgating application additional ornamentation on solid sides and ends 112 and 114 may include a team, e.g., a STEELER® logo PACKERS® for football, as these particular sports team fans are well known for their tailgating endeavors on gameday.

The present invention has been described with reference to specific details of particular embodiments thereof. It is not intended that such details be regarded as limitations upon the scope of the invention except insofar as and to the extent that they are included in the accompanying claims. A number of variations to the present invention will be apparent to those of ordinary skill in the art and these variations will not depart from the spirit and scope of the present invention. The scope of the invention is defined by the appended claims and equivalents thereto.

What is claimed is:

1. A one-piece, portable, collapsible, insulating chafing dish frame comprising:
    a pair of opposed sides;
    a pair of opposed ends;
    wherein the sides and ends are formed as corrugated cardboard sheets and further including a plurality of vents in the sides and ends;
    living hinges coupling the ends and the sides, wherein upper edges of the sides and ends are configured to support a water pan or associated chafing pan, further including a plurality of living hinges folding the sides along each side; and
    at least one integral burner support with burner openings for supporting burners there in wherein each of said at least one integral burner support is hinged to one of the ends.

2. A one-piece, portable, collapsible, insulating chafing dish frame comprising:
    a pair of opposed sides;
    a pair of opposed ends, wherein the sides and ends are formed as an anodized aluminum sheet;
    hinges coupling the ends and the sides with a plurality of leaves formed on the sides and the ends and the leaves forming air flow opening alternately on the sides and ends along the hinges, wherein upper edges of the sides and ends are configured to support a water pan or associated chafing pan;
    further including an integral burner support, wherein the integral burner support includes a top with burner openings for supporting burners there in, wherein the top is hinged to one of the sides and wherein the integral burner support includes three legs on three sides of the top, each secured thereto through a respective hinge.

3. The one-piece, portable, collapsible, insulating chafing dish frame according to claim 2 wherein only openings in the sides or ends are in the area of the hinges.

4. The one-piece, portable, collapsible, insulating chafing dish frame according to claim 2 wherein the upper and lower edges of each of the sides and ends incorporate a rolled reinforced edge.

5. The one-piece, portable, collapsible, insulating chafing dish frame according to claim 2 wherein the hinges are piano style hinges formed by overlapping meshed engaging leaves from adjacent members of the sides and ends, with the leaves extending around a center metal hinge pin.

6. The one-piece, portable, collapsible, insulating chafing dish frame according to claim 5 wherein the formation of hinges along the coupling of the opposing sides to the opposing ends create airflow openings for unimpeded operation of the burners.

7. A one-piece, portable, collapsible, insulating chafing dish frame comprising:
a pair of opposed sides, each side having at least one side hinge within each side spaced from the ends of the side;
a pair of opposed ends; and
side to end coupling hinges coupling the ends and the sides, wherein upper edges of the sides and ends are configured to support a water pan or associated chafing pan, and wherein the side to end coupling hinges are parallel to each of the at least one side hinges and wherein the one-piece, portable, collapsible, insulating chafing dish frame configured to be collapsed to flat configuration having a profile in end view no larger than the ends, and wherein the frame is formed of corrugated cardboard.

8. The one-piece, portable, collapsible, insulating chafing dish frame according to claim 7, wherein the side hinges and the side to end hinges are living hinges.

9. The one-piece, portable, collapsible, insulating chafing dish frame according to claim 7, further including at least one integral burner support hinged to one of a side or an end.

10. The one-piece, portable, collapsible, insulating chafing dish frame according to claim 9, wherein each burner support includes a top with burner openings for supporting burners there in.

11. The one-piece, portable, collapsible, insulating chafing dish frame according to claim 10, wherein the top of each burner support is hinged to one of the ends.

12. The one-piece, portable, collapsible, insulating chafing dish frame according to claim 10, wherein the top of each burner support is hinged to one of the sides and wherein the burner support includes three legs on three sides of the top, each secured thereto through a respective hinge.

* * * * *